(12) United States Patent
Oguri

(10) Patent No.: US 11,340,447 B2
(45) Date of Patent: May 24, 2022

(54) SCANNING DEVICE

(71) Applicant: HAMAMATSU PHOTONICS K.K., Hamamatsu (JP)

(72) Inventor: Akihiro Oguri, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/478,989

(22) PCT Filed: Oct. 20, 2017

(86) PCT No.: PCT/JP2017/038016
§ 371 (c)(1),
(2) Date: Jul. 18, 2019

(87) PCT Pub. No.: WO2018/135056
PCT Pub. Date: Jul. 26, 2018

(65) Prior Publication Data
US 2019/0353895 A1    Nov. 21, 2019

(30) Foreign Application Priority Data
Jan. 23, 2017  (JP) .............................. JP2017-009746

(51) Int. Cl.
*G02B 26/10* (2006.01)
*G02B 27/01* (2006.01)
(Continued)

(52) U.S. Cl.
CPC ......... *G02B 26/10* (2013.01); *G02B 27/0101* (2013.01); *G03B 21/2033* (2013.01); *H04N 5/74* (2013.01)

(58) Field of Classification Search
None
See application file for complete search history.

(56) References Cited

U.S. PATENT DOCUMENTS

| 6,366,386 | B1 | 4/2002 | Kato |
| 2009/0323181 | A1 | 12/2009 | Andrews et al. |

(Continued)

FOREIGN PATENT DOCUMENTS

| CN | 1619356 A | 5/2005 |
| CN | 101233443 A | 7/2008 |

(Continued)

OTHER PUBLICATIONS

International Preliminary Report on Patentability dated Aug. 1, 2019 for PCT/JP2017/038016.

*Primary Examiner* — Kent W Chang
*Assistant Examiner* — Benjamin Morales
(74) *Attorney, Agent, or Firm* — Faegre Drinker Biddle & Reath LLP

(57) ABSTRACT

A display device includes: a light source unit that outputs laser light; a light-guide optical system that forms a plurality of optical paths of the laser light; an optical path switch element that switches an optical path of the laser light to any one of the plurality of optical paths; an optical member that forms a single optical path in a subsequent stage of the plurality of optical paths; and a projection mirror that forms a projection image to be projected on a screen by scanning the laser light that passed through the single optical path. The plurality of optical paths includes an optical path for low luminance and an optical path for high luminance which make the laser light have different luminance. The optical path switch element is disposed on an optical path between the light source unit and the projection mirror.

9 Claims, 8 Drawing Sheets

(51) Int. Cl.
 *G03B 21/20* (2006.01)
 *H04N 5/74* (2006.01)

(56) References Cited

U.S. PATENT DOCUMENTS

| | | | |
|---|---|---|---|
| 2014/0160439 A1* | 6/2014 | Ikeda | H04N 9/3144 |
| | | | 353/31 |
| 2014/0293435 A1* | 10/2014 | Kobayashi | G02B 27/0101 |
| | | | 359/631 |
| 2015/0062345 A1 | 3/2015 | Kusanagi | |
| 2015/0260984 A1 | 9/2015 | Yamakawa et al. | |
| 2017/0280115 A1* | 9/2017 | Hatagi | G09G 3/3406 |
| 2018/0373025 A1* | 12/2018 | Miyatake | G02B 26/101 |
| 2019/0324265 A1* | 10/2019 | Milanovic | G02B 26/101 |

FOREIGN PATENT DOCUMENTS

| | | |
|---|---|---|
| JP | 2011-22524 A | 2/2011 |
| JP | 2011-128423 A | 6/2011 |
| JP | 2014-074818 A | 4/2014 |
| JP | 2015-049266 A | 3/2015 |
| JP | 2015-525899 A | 9/2015 |
| JP | 2016-25430 A | 2/2016 |
| TW | 200535454 A | 11/2005 |
| WO | WO-2007/077710 A1 | 7/2007 |
| WO | WO 2008/044709 A1 | 4/2008 |
| WO | WO-2014/013144 A1 | 1/2014 |
| WO | WO-2015/190157 A1 | 12/2015 |

\* cited by examiner

SCANNING DEVICE

TECHNICAL FIELD

This embodiment relates to a display device.

BACKGROUND ART

In recent years, a development of display devices such as head-up displays or head mounted displays has been advanced. Those display devices project a projection image on a display disposed, for example, in front of a user's field of view and display the image while making the image superimposed on the background. From a viewpoint of achieving good visibility, such display devices require adjustment of luminance of a projection image depending on circumstances (particularly, on brightness). Accordingly, such display devices require to have a sufficient dimming ratio (luminance gradient) of a projection image.

For example, a head-up display device disclosed in Patent Literature 1 includes a first laser light source that outputs a first laser light having relatively high luminance and a second laser light source that outputs a second laser light having relatively low luminance. This head-up display device in the related art switches the first light source and the second light source depending on circumstances so as to achieve a dimming ratio of a projection image.

A head-up display device disclosed in Patent Literature 2, for example, is provided with a light attenuation unit such as a filter in a subsequent stage of a light source. A drive unit such as an actuator moves the light attenuation unit back and forth relative to an optical path of laser light so as to achieve a dimming ratio of a projection image.

CITATION LIST

Patent Literature

Patent Literature 1: Japanese Unexamined Patent Publication No. 2016-25430
Patent Literature 2: Japanese Unexamined Patent Publication No. 2015-525899

SUMMARY OF INVENTION

Technical Problem

A typical laser light source is a device that has difficulty in maintaining stable operation with a low output. A head-up display in the related art adjusts luminance by controlling an output from a laser light source. However, in adjusting luminance by output control of a laser light source, stable operation with a low output remains as an unsolved issue. For this reason, there is a limit on display of a projection image with low luminance, and it is difficult to achieve a sufficient dimming ratio. Furthermore, a device in which two different laser light sources are switched, as disclosed in Patent Literature 1, may increase in size, and accordingly, cause cost increase. A device provided with a light attenuation unit that moves back and forth relative to an optical path of laser, as disclosed in Patent Literature 2, may also increase in size.

The present invention has been made to solve the above problems, and an object of the present invention is provide a display device that enables enhancement of dimming ratio of a projection image without increasing in size.

Solution to Problem

A display device according to this embodiment includes: a light source unit configured to output laser light; a light-guide optical system configured to form a plurality of optical paths of the laser light; an optical path switch element configured to switch an optical path of the laser light to any one of the plurality of optical paths; an optical member configured to form a single optical path in a subsequent stage of the plurality of optical paths; a projection mirror configured to form a projection image to be projected on a screen by scanning the laser light that passed through the single optical path. The plurality of optical paths includes an optical path for low luminance and an optical path for high luminance which make the laser light have different luminance. The optical path switch element is disposed on an optical path between the light source unit and the projection mirror. The display device includes a control unit configured to control luminance of the projection image by controlling the output of the laser light in the light source unit, and controlling the switching of the optical path of the laser light by the optical path switch element.

In this display device, the luminance of the projection image is controlled by controlling the output of the laser light in the light source unit, and controlling the switching of the optical path of the laser light by the optical path switch element. Such control sufficiently enhances a dimming ratio of the projection image. In this display device, the optical path switch element that switches between the optical path for low luminance and the optical path for high luminance is disposed on an optical path between the light source unit and the projection mirror. Since the optical path switch element is disposed in a preceding stage of the projection mirror, it is possible to control the luminance by switching the optical paths before the scanning laser light is spread by the projection mirror. This makes it possible to avoid enlargement of a device as compared with a device in which light sources having different luminance are disposed separately or a device which makes a light attenuation unit move back and forth relative to an optical path of laser light.

In the plurality of optical paths, at least the optical path for low luminance may include a plurality of luminance attenuation elements. In this case, a desired amount of attenuation of the laser light may be achieved by the plurality of luminance attenuation elements. Accordingly, there is no need to provide one luminance attenuation element with excessive attenuation characteristics, which enables stable luminance attenuation.

In addition, a condenser configured to collect the laser light on the screen may be disposed between the light source unit and the projection mirror. This arrangement makes it possible to display a high-resolution projection image on the screen.

The light source unit may include a plurality of light sources configured to output laser light having different wavelengths. In this case, the projection image is formed by laser light corresponding to, for example, each of RGB.

The display device may include a multiplexing optical system configured to multiplex the laser light output from the plurality of light sources. Even when the plurality of light sources is used, this arrangement standardizes the optical paths of the laser light and enables downsizing of the device.

Furthermore, an aperture may be disposed between the optical path switch element and the projection mirror. An angle shift of the optical path switch element may cause an optical axis shift of the laser light in a subsequent stage of the optical path switch element. With the optical axis shift, incidence of the laser light upon the projection mirror may cause stray light. Disposing the aperture between the optical path switch element and the projection mirror makes it possible to block a component of the laser light in a portion where the optical axis is shifted by the aperture, which leads to prevention of stray light.

The aperture may be disposed between the optical member and the projection mirror. In a case where an optical axis shift of the laser light due to refraction is caused in the optical member, incidence of the laser light upon the projection mirror with the optical axis shift may cause stray light. Disposing the aperture between the optical member and the projection mirror makes it possible to block a component in which the optical axis is shifted by the aperture, which leads to prevention of stray light. This arrangement is particularly useful when the optical member is inclined relative to the optical axis of the laser light.

Still further, a light receiving element configured to the laser light may be disposed in a subsequent stage of the optical member. Monitoring a position of the optical axis of the laser light with the light receiving element makes it possible to prevent stray light more reliably. Furthermore, monitoring a light intensity of the laser light with the light receiving element makes it possible to stably control the luminance of the projection image.

The light receiving element may at least detect the laser light that passed through the optical path for low luminance. Since an amount of attenuation of the laser light is larger in the optical path for low luminance than in the optical path for high luminance, it is particularly useful to monitor a light intensity of the laser light with the light receiving element.

Advantageous Effects of Invention

With this display device, it is possible to enhance a dimming ratio of a projection image without upsizing the device.

DESCRIPTION OF EMBODIMENTS

With reference to the drawings, preferred embodiments of a display device according to an aspect of the present invention will now be described in detail.

Figure 1:
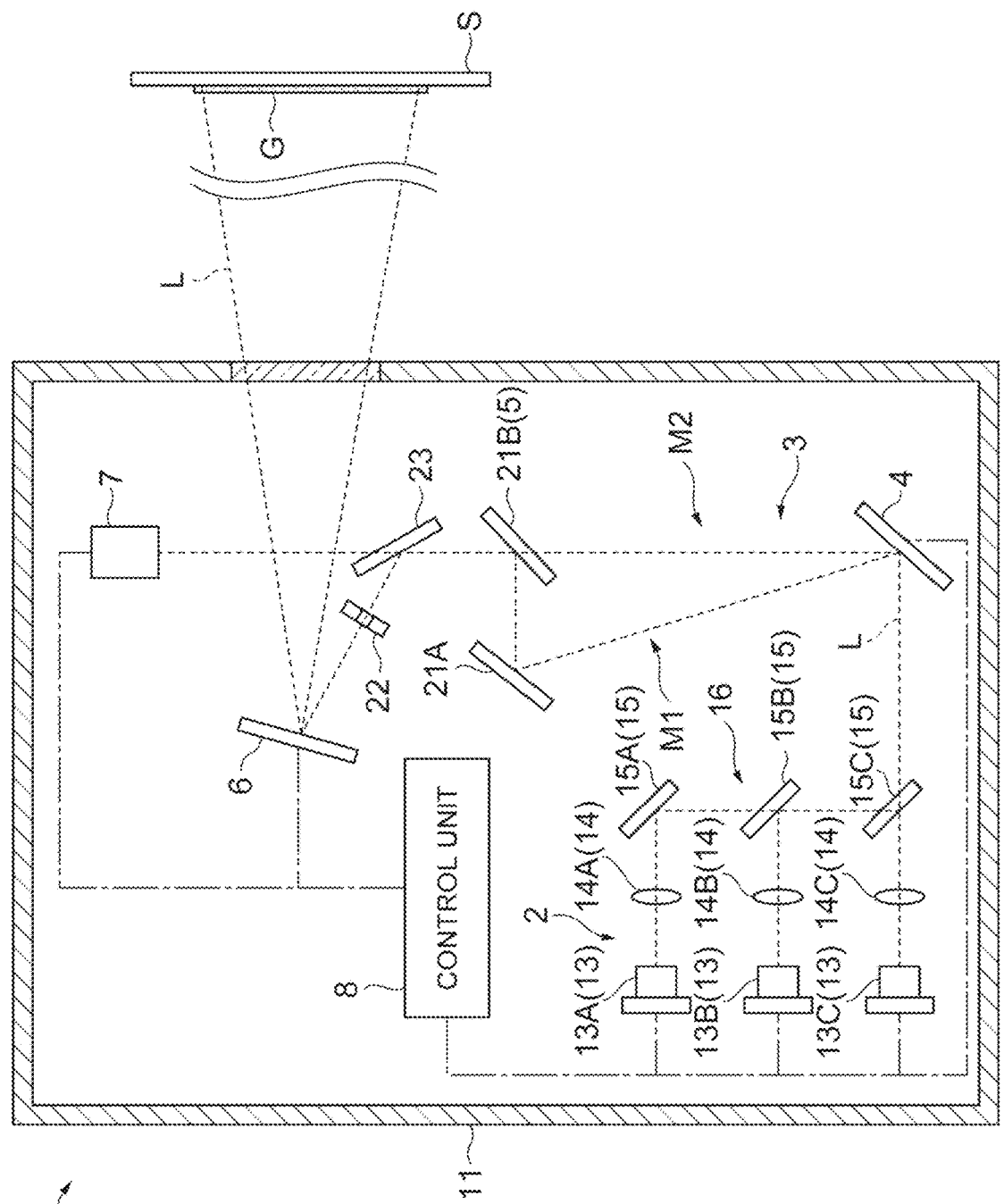
FIG. 1 is a schematic view illustrating an arrangement of a display device according to an embodiment.

FIG. 1 is a schematic view illustrating an arrangement of a display device according to an embodiment. A display device 1 is a scanning-projection display device that scans a screen S with laser light L and forms a projection image G.

The display device 1 is applied to, for example, a head-up display which is to be mounted on a vehicle. The screen S includes, for example, a diffusion plate. When the laser light L modulated by a predetermined projection signal is projected on the diffusion plate, the projection image G is formed. Displaying the projection image G on the windshield of a vehicle enables a user to visualize the image projected on the windshield while making the image superimposed on the background.

The display device 1 includes, as illustrated in FIG. 1, a light source unit 2 that outputs the laser light L, a light-guide optical system 3 that forms a plurality of optical paths of the laser light L, an optical path switch element 4 that switches an optical path of the laser light L to any of the plurality of optical paths, an optical member 5 that forms a single optical path in a subsequent stage of the plurality of optical paths, a projection mirror 6 that allows scanning with the laser light L to form the projection image G, a light receiving element 7 that detects the laser light L, and a control unit 8 that controls driving of the display device 1.

These components are provided, for example, on a substrate (not illustrated) disposed inside a housing 11. The housing 11 includes, for example, aluminum (aluminum die casting alloys such as ADC12) and has a light blocking effect against the laser light L and ambient light. One surface of the housing 11 is provided with a window member 12 that outputs, toward the screen S, the laser light L used for scanning by the projection mirror 6. The window member 12 includes optical glass such as BK7. The window member 12 is preferably provided with a thin film or the like which transmits the laser light L and blocks ambient light.

The light source unit 2 is provided with a unit including a plurality of light sources 13 (13A (red), 13B (green), 13C (blue)) that respectively emits the laser light L corresponding to wavelengths of RGB. Examples of the light sources 13 include laser diodes (LD), vertical cavity surface emitting lasers (VCSEL), super luminescent diodes (SLD), and light emitting diodes (LED). The drive of the light sources 13 is controlled based on control signals from the control unit 8.

In the light source unit 2, condensers 14 (14A to 14C) are disposed corresponding to the light sources 13A to 13C, respectively. In addition, dichroic mirrors 15 (15A to 15C) are disposed in a subsequent stage of the condensers 14A to 14C, respectively. The condensers 14 are, for example, convex lens, elements that collect the laser light L on the screen S. In this embodiment, the condensers 14A to 14C are disposed close to the light sources 13A to 13C, respectively, but the condensers 14 may be disposed in any place as long as they are on an optical path between the light sources 13 and the projection mirror 6.

The dichroic mirrors 15A to 15C are included a multiplexing optical system 16 that multiplexes the laser light L output from the light sources 13A to 13C. The laser light L output from the light sources 13A to 13C are made coaxial by the dichroic mirrors 15A to 15C through the condensers 14A to 14C and is guided to the optical path switch element 4.

In this embodiment, the light-guide optical system 3 is an optical system that forms two optical paths, an optical path for low luminance M1 and an optical path for high luminance M2, which makes the laser light L have different luminance. The optical path for low luminance M1 includes the optical path switch element 4 and mirrors (luminance attenuation elements) 21A and 21B. On the other hand, the optical path for high luminance M2 includes the optical path switch element 4 and one mirror 21B. The optical path switch element 4 is an element disposed on an optical path between the light source unit 2 and the projection mirror 6. Examples of the optical path switch element 4 include a micro electro mechanical systems (MEMS) mirror and a polygon mirror. The optical path switch element 4 is driven based on a control signal from the control unit 8 and guides the laser light L from the light source unit 2 to one of the optical path for low luminance M1 and the optical path for high luminance M2.

Each of the mirrors 21A and 21B is a partial reflection mirror that reflects part of the laser light L and transmits the most part. When the optical path switch element 4 guides the laser light L to the optical path for low luminance M1, the laser light L is greatly attenuated by being reflected by each of the mirror 21A and the mirror 21B. When the optical path switch element 4 guides the laser light L to the optical path for high luminance M2, the laser light L passes through the mirror 21B without being attenuated that much. In the laser light L that passes through the optical path for low luminance M1, a component transmitted through the mirror 21B is blocked by a wall of the housing 11.

The mirror 21B has an attenuation factor of 50% or more, and the luminance attenuation element in a preceding stage of the mirror 21B (mirror 21A in this case) in the optical path for low luminance M1 preferably has an attenuation factor of 50% or more. In a case where a plurality of luminance attenuation elements is disposed in the preceding stage of the mirror 21B, an attenuation factor of 50% or more may be achieved by the plurality of luminance attenuation elements.

In this embodiment, the optical member 5 includes the mirror 21B. This mirror 21B forms a single optical path for the laser light L disposed in a subsequent stage of the optical path for low luminance M1 and the optical path for high luminance M2. In other words, the laser light L that has passed through the optical path for low luminance M1 and the laser light L that has passed through the optical path for high luminance M2 become coaxial in a subsequent stage of the mirror 21B and become the same optical path. In addition, a partial transmission mirror 23 is disposed, as a reflection unit that bends the optical paths of the laser light L, in the subsequent stage of the mirror 21B. The partial transmission mirror 23 is an element that transmits part of the laser light L and reflects the most part. The laser light L reflected by the partial transmission mirror 23 is guided to the projection mirror 6. The partial transmission mirror 23 bends the optical paths of the laser light L from the mirror 21B at a predetermined angle, which enables downsizing of the device. However, the partial transmission mirror 23 may be omitted.

Furthermore, an aperture 22 corresponding to a light diameter of the laser light L is disposed on an optical path between the optical member 5 and the projection mirror 6. In this embodiment, the aperture 22 is disposed between the partial transmission mirror 23 and the projection mirror 6. If an optical axis shift of the laser light L from the optical member 5 occurs, a component of the laser light L in a portion with an optical axis shift is blocked by the aperture 22. It should be noted that the aperture 22 may be disposed between the optical path switch element 4 and the projection mirror 6. The aperture 22 may be disposed between the mirror 21B and the partial transmission mirror 23 or may be disposed in each of the optical path for low luminance M1 and the optical path for high luminance M2.

The projection mirror 6 is an element that allows scanning of the screen S with the laser light L that has passed through the single optical path, thereby forming the projection image G which is to be projected on the screen S. Examples of the projection mirror 6 include a micro electro mechanical systems (MEMS) mirror and a polygon mirror. The projection mirror 6 oscillates at a predetermined frequency based on a control signal from the control unit 8. Oscillation of the projection mirror 6 allows scanning of the screen S with the laser light L output to the outside of the housing 11 through the window member 12 and leads to formation of the projection image G on the screen S.

The light receiving element 7 is an element that monitors an optical axis and a light intensity of the laser light L. An example of the light receiving element 7 includes a PIN photodiode. The light receiving element 7 is disposed in a subsequent stage of the optical member 5 and detects, in regard to the laser light L that has passed through the optical path for low luminance M1, at least a component transmitted through the partial transmission mirror 23. The light receiving element 7 generates information indicating a detection result of the laser light L and outputs the result to the control unit 8.

Particularly, in detecting the laser light L with low luminance, from a viewpoint of avoiding influences of unnecessary light including ambient light, it is preferable that the display device 1 be provided with a band pass filter or the like in a preceding stage of the light receiving element 7. Furthermore, the display device 1 may be provided with a plurality of light receiving elements 7 that separately detects the laser light L of each of RGB. In this case, one of RGB may be set in advance as a reference color, and after an output of the laser light L of the reference color is adjusted, an output of the laser light L of another color may be adjusted according to the output. When a light intensity of the laser light L is detected by the light receiving element 7, a signal may be multiplied on a circuit of the light receiving element 7, and the multiplied value may be used as the detection result.

The control unit 8 is, physically, a computer that includes a memory such as RAM and ROM, a processor (arithmetic circuit) such as a CPU, a storage unit such as a communication interface and a hard disk, and a display unit such as a display. Examples of such computer include personal computers, cloud servers, and smart devices (such as smart phones and tablet terminals). The computer causes the CPU to execute a program stored in the memory and executes the following functional processing.

The control unit 8 is, functionally, a section that controls driving of the light sources 13, the optical path switch element 4, and the projection mirror 6. The control unit 8 receives detection information associated with the brightness outside a vehicle from, for example, a brightness sensor disposed outside the device. Based on the detection information, the control unit 8 combines the output control of the laser light L in the light source unit 2 and the switching control of the optical paths of the laser light L in the optical path switch element 4 so as to control the luminance of the projection image thereby achieving the visibility of the projection image G. In other words, the control unit 8 controls the output of the laser light L and causes the laser light L to pass through one of the optical path for low luminance M1 and the optical path for high luminance M2 so as to change the luminance of the projection image G. For example, when the outside of the vehicle is bright, the control unit 8 switches the optical path of the laser light L to the optical path for high luminance M2 and increases the luminance of the projection image G. For example, when the outside of the vehicle is dark and the luminance of the projection image G is not sufficiently decreased in the optical path for high luminance M2, the control unit 8 switches the optical path of the laser light L to the optical path for low luminance M1 and decreases the luminance of the projection image G sufficiently.

As described above, in this display device 1, the luminance of the projection image G is controlled by the output control of the laser light L in the light source unit 2 and the switching control of the optical paths of the laser light L in the optical path switch element 4. Such control sufficiently enhances a dimming ratio of the projection image G. In this embodiment, at least the optical path for low luminance M1 among the plurality of optical paths include a plurality of mirrors (luminance attenuation elements) 21A and 21B. In this case, a desired amount of attenuation of the laser light L may be achieved by the plurality of luminance attenuation elements. Accordingly, there is no need to provide one luminance attenuation element with excessive attenuation characteristics, which enables stable luminance attenuation.

When the optical path for low luminance M1 includes one mirror, it is necessary to provide the mirror with high attenuation characteristics. However, it is difficult to stably manufacture a mirror having an attenuation factor of 99% or more (transmittance of 99% or more, or reflectance of 1% or less). Furthermore, in a case where the optical path for low luminance M1 includes one mirror having transmittance of 99% or less, assuming that the intensity of the laser light L is controlled within a range from 1 mW to 100 mW, the dimming ratio becomes 9900:1 at a maximum. In contrast, in a case where attenuation is performed by a plurality of mirrors, a mirror with excessive attenuation characteristics is not required, and using a mirror with an attenuation factor that enables stable manufacturing offers a dimming ratio of 10000:1 or more. In addition, in the case where attenuation is performed by the plurality of mirrors, even if each mirror has a manufacturing error in attenuation factor, deviation of the luminance from desired luminance is made smaller. Accordingly, it is possible to reduce burden in manufacturing.

For example, assume that the laser light L output from the light source 13A (red) is controlled to have intensity from 2 mW to 200 mW, and the laser light L output from each of the light source 13B (green) and the light source 13C (blue) is controlled to have an intensity from 1 mW to 100 mW. In this case, when the mirror 21A has reflectance of 4.0% with respect to the laser light L of each of RGB, and the mirror 21B has reflectance of 20.0% and transmittance of 80.0%, a dimming ratio is about 10000:1. Furthermore, changing the characteristics of the mirror 21A and the mirror 21B makes it possible to switch between the optical path for low luminance M1 and the optical path for high luminance M2. In this case, when the mirror 21A has reflectance of 100.0%, and the mirror 21B has reflectance of 99.0% and transmittance of 1.0%, a dimming ratio is about 9900:1.

In this display device 1, the optical path switch element 4 that switches between the optical path for low luminance M1 and the optical path for high luminance M2 is disposed on an optical path between the light source unit 2 and the projection mirror 6. Since the optical path switch element 4 is disposed in a preceding stage of the projection mirror 6, it is possible to control the luminance by switching the optical paths before the scanning laser light L is spread by the projection mirror 6. This makes it possible to avoid enlargement of a device as compared with a device in which light sources having different luminance are disposed separately or a device which makes a light attenuation unit move back and forth relative to an optical path of laser light. This arrangement also prevents an increase in optical path length due to the optical path for low luminance M1 and the optical path for high luminance M2. Prevention of an increase in optical path length prevents enlargement of the condenser 14 that collects the laser light L on the screen S.

In the display device 1, the condenser 14 that collects the laser light L on the screen S is disposed between the light sources 13 and the projection mirror 6. This arrangement makes it possible to collect the laser light L at a position on the screen S and to display the high-resolution projection image G.

In the display device 1, the light source unit 2 includes the plurality of light sources 13A to 13C which outputs the laser light L having different wavelengths. Accordingly, the projection image G is formed by the laser light L corresponding to, for example, each of RGB. Furthermore, the display device 1 is provided with the multiplexing optical system 16 that multiplexes the laser light L output from the plurality of light sources 13A to 13C. This arrangement standardizes the optical paths of the laser light L even when the plurality of light sources 13A to 13C is used, which enables downsizing of the device.

In addition, in the display device 1, the aperture 22 is disposed between the optical path switch element 4 and the projection mirror 6. An angle shift of the optical path switch element 4 may cause an optical axis shift of the laser light L in a subsequent stage of the optical path switch element 4. With an optical axis shift, incidence of the laser light L upon the projection mirror 6 may cause stray light. Disposing the aperture 22 between the optical path switch element 4 and the projection mirror 6 makes it possible for a component of the laser light L in a portion where the optical axis is shifted to be blocked by the aperture 22, which leads to prevention of stray light.

In this embodiment, the aperture 22 is disposed between the optical member 5 (mirror 21B) and the projection mirror 6. In a case where the optical axis shift of the laser light L due to refraction is caused in the optical member 5, incidence of the laser light L upon the projection mirror 6 with the optical axis shift may cause stray light. Disposing the aperture 22 between the optical path switch element 4 and the projection mirror 6 makes it possible for a component of the laser light L in a portion where the optical axis is shifted to be blocked by the aperture 22, which leads to prevention of stray light. Furthermore, it is possible to prevent degradation of quality of the projection image G attributed to a color shift caused by the optical axis shift. This arrangement is particularly useful when the optical member 5 is inclined relative to the optical axis of the laser light L.

In the display device 1, the light receiving element 7 that detects the laser light L that has passed through at least the optical path for low luminance M1 is disposed in the subsequent stage of the optical member 5. Monitoring a position of the optical axis of the laser light L with the light receiving element 7 makes it possible to prevent stray light more reliably. Furthermore, monitoring a light intensity of the laser light L with the light receiving element 7 makes it possible to stably control the luminance of the projection image G. Particularly, since an amount of attenuation of the laser light L is larger in the optical path for low luminance M1 than in the optical path for high luminance M2, it is useful to monitor a light intensity of the laser light L with the light receiving element 7. It should be noted that the light receiving element 7 may detect one of a light intensity of the laser light L and a position of the optical axis of the laser light L.

Figure 2:
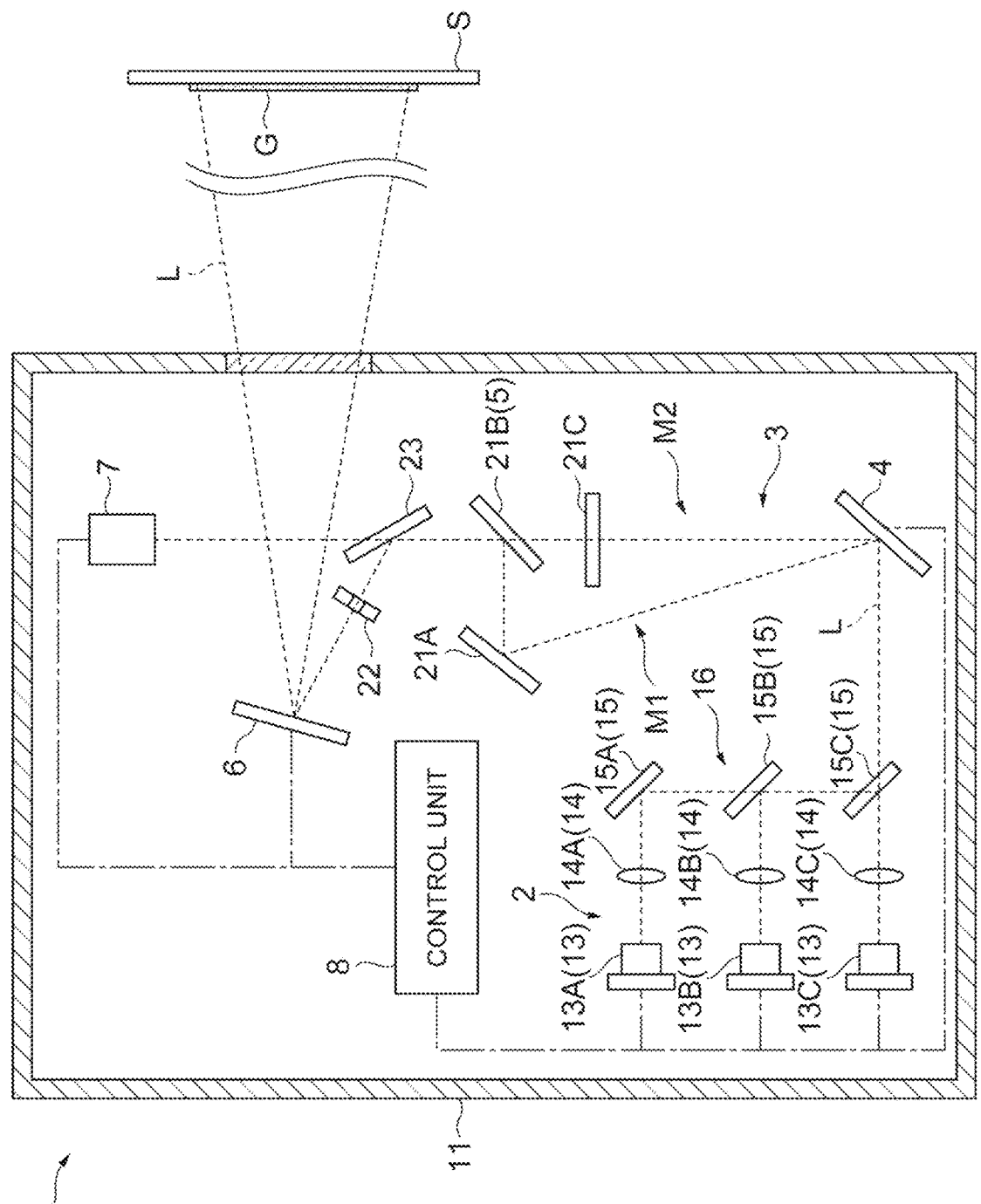
FIG. 2 is a schematic view illustrating an arrangement of a display device according to a modification.

The present invention should not be restricted to the aforementioned embodiment. For example, in the embodiment, the optical path for low luminance M1 includes the mirrors 21A and 21B, and the optical path for high luminance M2 includes the mirror 21B, but the number of the luminance attenuation elements included in the optical path for low luminance M1 and the optical path for high luminance M2 may be any number. For example, as illustrated in FIG. 2, a partial reflection mirror 21C may be additionally disposed in the optical path for high luminance M2. The partial reflection mirror 21C may be disposed between the mirror 21B and the partial transmission mirror 23. With such an arrangement in which the luminance of the laser light L is attenuated by a plurality of mirrors, even if there is a manufacturing error in attenuation factor, it is possible to reduce deviation from desired luminance. In the example of FIG. 2, in place of the partial reflection mirror 21C, an element that absorbs part of energy of the laser light L, such as an attenuation filter, may be disposed as a luminance attenuation element in the display device 1.

Figure 3:
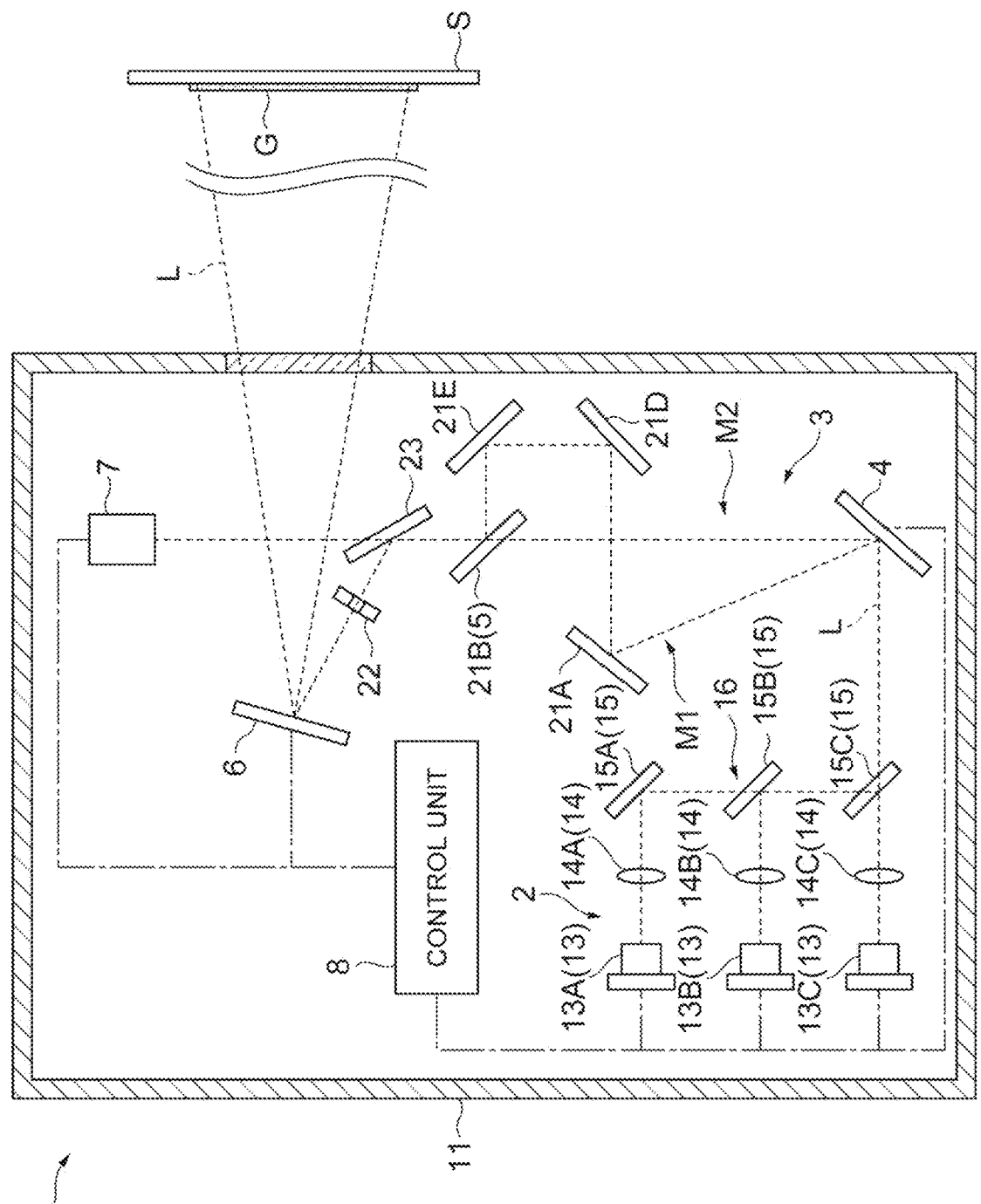
FIG. 3 is a schematic view illustrating an arrangement of a display device according to another modification.

In addition, as illustrated in FIG. 3, for example, partial reflection mirrors 21D and 21E may be additionally disposed in the optical path for low luminance M1 so as to attenuate the laser light L in a stepwise manner. According to such an arrangement, two or more luminance attenuation units are provided in a preceding stage of the mirror 21B in the optical path for low luminance M1, and this arrangement enables reduction of attenuation factor in each luminance attenuation element. Therefore, it is possible to reduce burden in manufacturing of each luminance attenuation element. Furthermore, even if there is a manufacturing error in attenuation factor, decreasing the attenuation factor of each luminance attenuation element makes deviation from desired luminance smaller.

Figure 4:
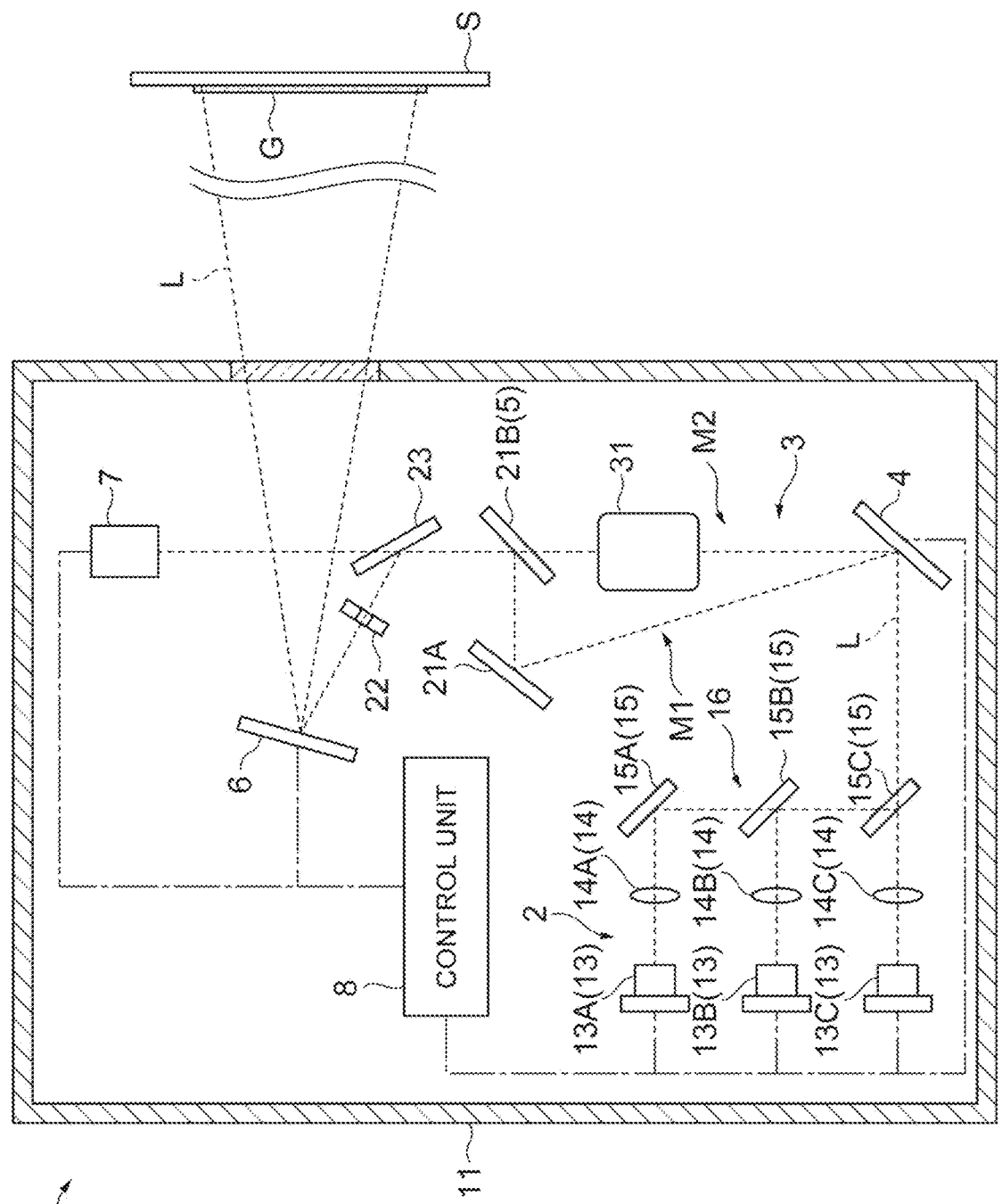
FIG. 4 is a schematic view illustrating an arrangement of a display device according to another modification.
Figure 5:
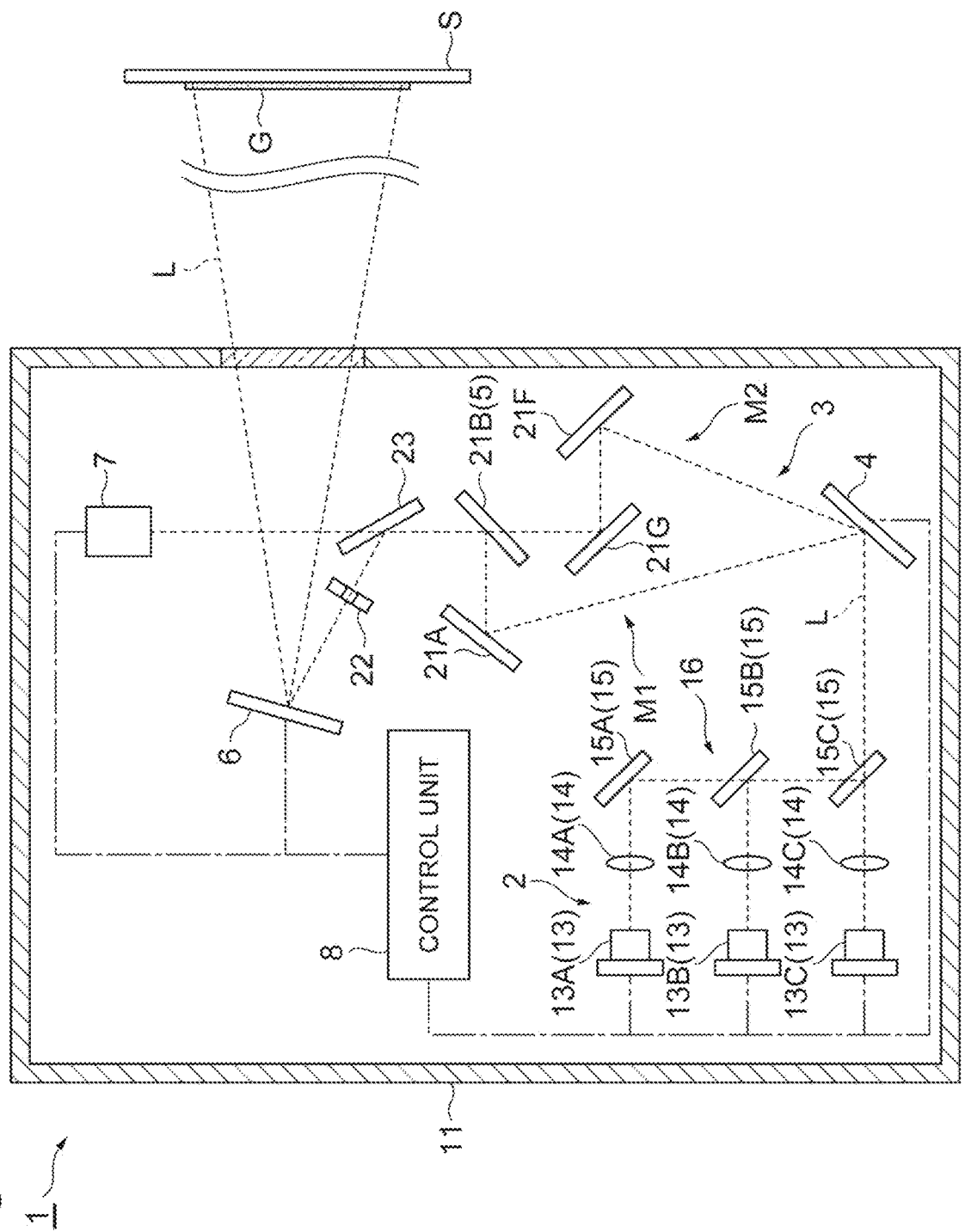
FIG. 5 is a schematic view illustrating an arrangement of a display device according to another modification.

The display device 1 may be further provided with a component that corrects an optical path length difference between the optical path for low luminance M1 and the optical path for high luminance M2. In this case, for example, as illustrated in FIG. 4, an optical path correcting element 31 may be disposed in the optical path for high luminance M2, and as illustrated in FIG. 5, mirrors 21F and 21G that form a delay circuit may be disposed in the optical path for high luminance M2. An example of the optical path correcting element 31 includes optical glass such as BK7. According to these arrangements, the optical path length difference between the optical path for low luminance M1 and the optical path for high luminance M2 is corrected, which enables a low-luminance display and a high-luminance display to come to a focus, thus making it possible to prevent degradation in quality of the projection image G.

Figure 6:
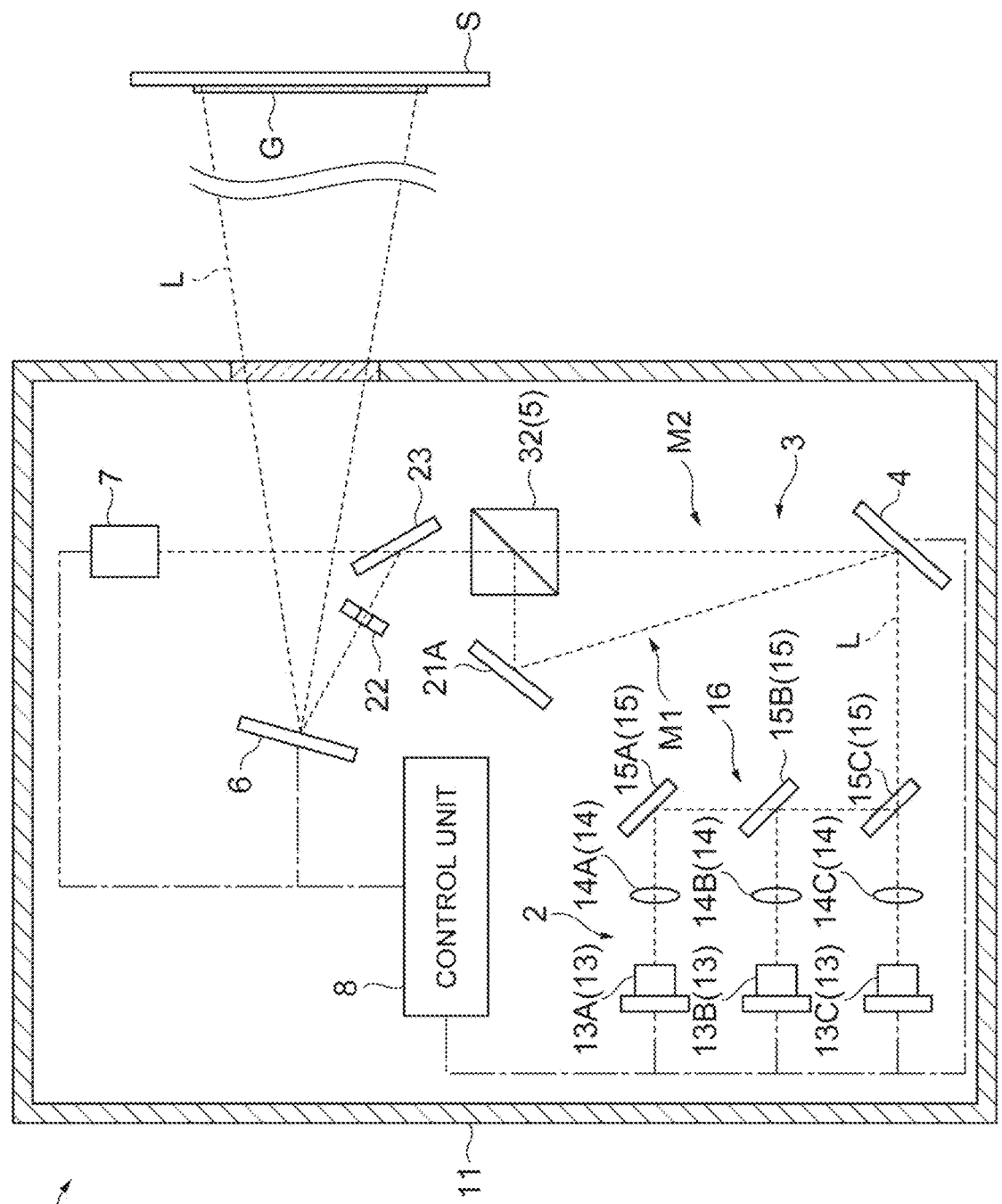
FIG. 6 is a schematic view illustrating an arrangement of a display device according to another modification.

The display device 1 may be further provided with a component that prevents an optical axis shift of the laser light L due to the mirror 21B. In this case, for example, as illustrated in FIG. 6, in place of the mirror 21B, a prism 32 may be disposed as the optical member 5 in such a manner that the laser light L from the optical path for low luminance M1 and the laser light L from the optical path for high luminance M2 enter the prism 32. According to such an arrangement, incidence of the laser light L upon the prism 32 in a perpendicular manner does not cause an optical axis shift due to refraction. Accordingly, it is possible to prevent stray light and color shift due to the optical axis shift. The prism 32 may function as a luminance attenuation element. For example, the prism 32 may be a prism that attenuates the laser light L passing through the optical path for low luminance M1 by 50% or more.

Figure 7:
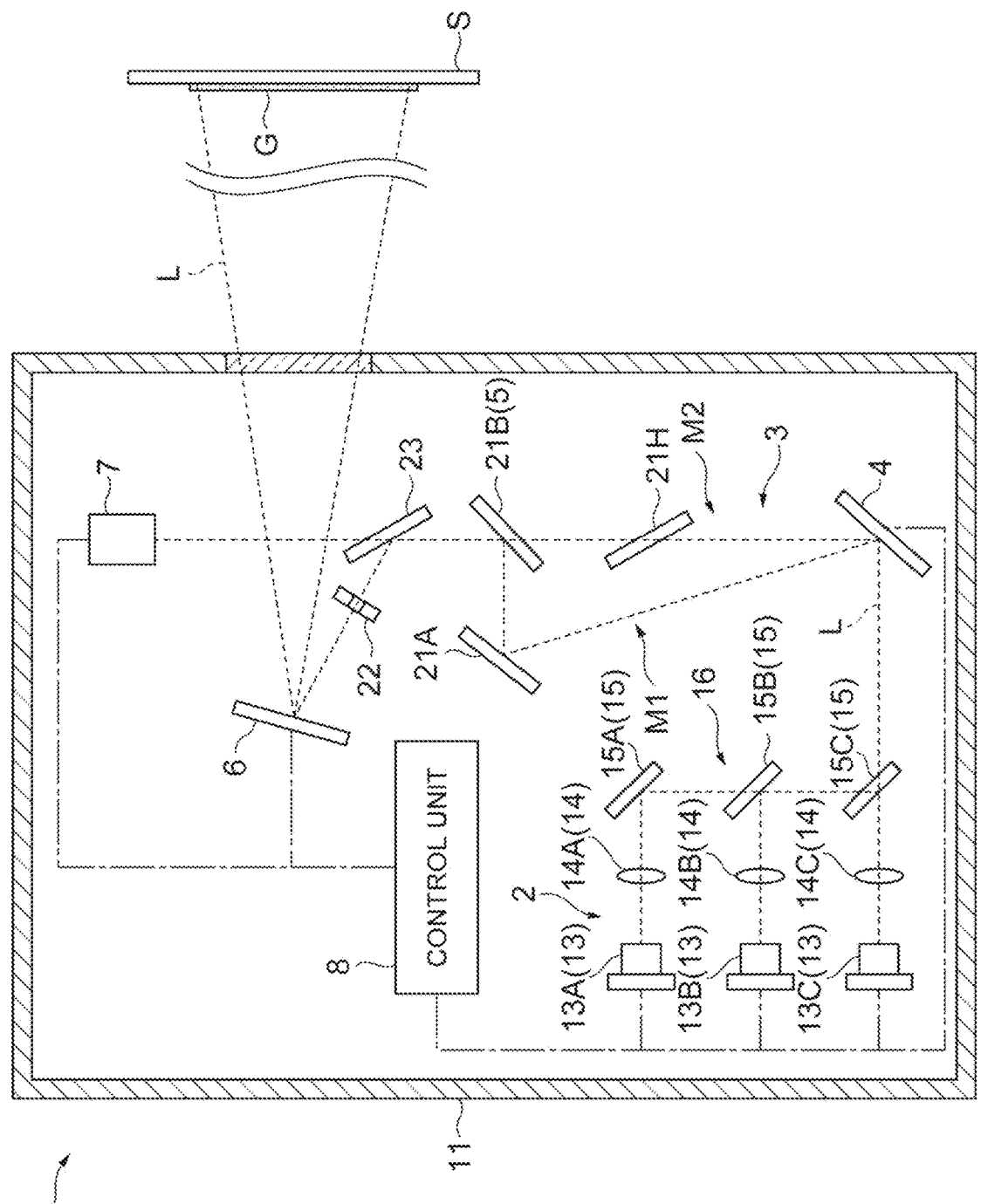
FIG. 7 is a schematic view illustrating an arrangement of a display device according to another modification.

Furthermore, for example, as illustrated in FIG. 7, the optical path for high luminance M2 may be provided with a mirror 21H that cancels out an optical axis shift of the laser light L due to the mirror 21B. Such an arrangement allows the mirror 21H to cancel out influences of the refraction of the laser light L on the mirror 21B, which enables correction of the optical axis shift.

Figure 8:
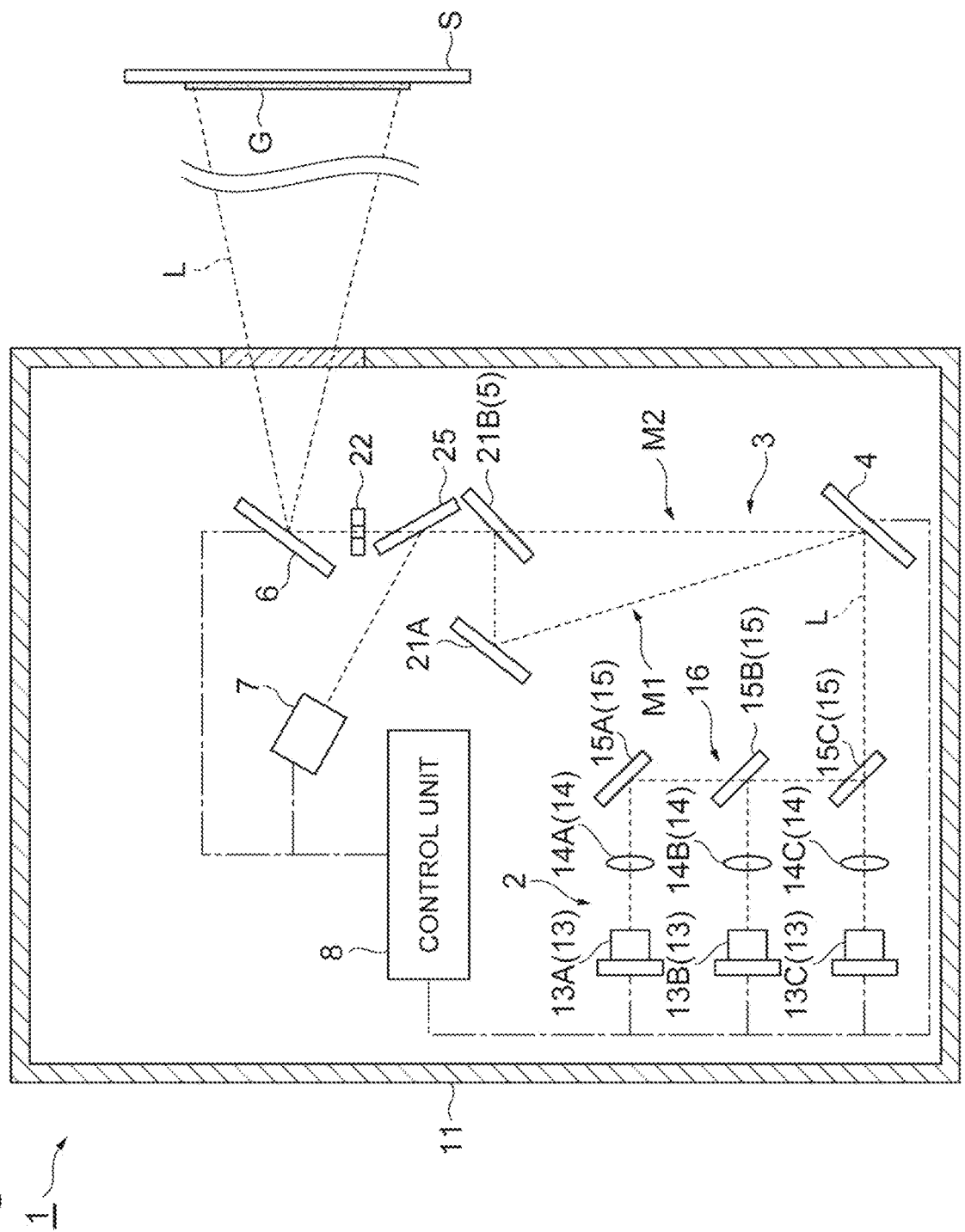
FIG. 8 is a schematic view illustrating an arrangement of a display device according to another modification.

Still further, a positional relationship between the projection mirror 6 and the light receiving element 7 may be changed. In place of the partial transmission mirror 23 in FIG. 1 and the like, an example illustrated in FIG. 8 employs a partial reflection mirror 25 that reflects part of the laser light L and transmits the most part. In this example, a positional relationship between the projection mirror 6, the aperture 22, and the light receiving element 7 is inversion of the arrangement illustrated in FIG. 1. With such an arrangement in which the positional relationship between the projection mirror 6 and the light receiving element 7 is inversed, an optical path length up to the screen S is reduced. Accordingly, it is possible to prevent enlargement of the condenser 14.

In the embodiment, the light receiving element 7 is disposed in the subsequent stage of the optical member 5. However, in a case where a wide range of light intensity detection is required in the light receiving element 7 due to enhancement in dimming ratio, a plurality of light receiving elements 7 having different ranges of light intensity detection may be disposed in the subsequent stage of the optical member 5. In this case, for example, a light intensity of the laser light L passing through the optical path for low luminance M1 may be detected by the light receiving element 7 disposed in the subsequent stage of the optical member 5, and a light intensity of the laser light L passing through the optical path for high luminance M2 may be detected by the light receiving element 7 disposed close to the light sources 13. With such an arrangement in which the light receiving elements for the laser light L passing through the optical path for low luminance M1 and the laser light L passing through the optical path for high luminance M2 are provided in the display device 1, the range of light intensity detection is expanded. Accordingly, it is possible to detect a light intensity even when the dimming ratio is enhanced.

The embodiment illustrates the display device 1 applied to a head-up display which is to be mounted on a vehicle, but the display device 1 may also be applied to devices other than the head-up display. In this case, the control unit 8 may execute switching control of the optical paths of the laser light L according to not only the brightness outside a vehicle but also the brightness of environmental light including the brightness outside the vehicle. Furthermore, the display device 1 may not be necessarily provided with the light receiving element 7. In a case where the light receiving element 7 is omitted, a high reflection mirror or the like may be disposed in the display device 1 in place of the partial transmission mirror 23.

REFERENCE SIGNS LIST 1 display device
2 light source unit
3 light-guide optical system
4 optical path switch element
5 optical member
6 projection mirror
7 light receiving element
8 control unit
13 (13A to 13C) light source
14 (14A to 14C) condenser
21A to 21E mirror (luminance attenuation element)
22 aperture
G projection image L laser light
M1 optical path for low luminance
M2 optical path for high luminance
S screen

The invention claimed is:

1. A scanning device comprising:
   a light source unit configured to output laser light;
   a light-guide optical system configured to form a plurality of optical paths of the laser light;
   an optical path switch element configured to switch an optical path of the laser light to any one of the plurality of optical paths;
   an optical member configured to form a single optical path in a subsequent stage of the plurality of optical paths;
   a projection mirror configured to scan the laser light that passed through the single optical path,
   wherein the plurality of optical paths includes an optical path for low luminance and an optical path for high luminance which make the laser light have different luminance,
   the optical path switch element is disposed on an optical path between the light source unit and the projection mirror, and is disposed on both the optical path for low luminance and the optical path for high luminance,
   the optical path switch element guides the laser light from the light source unit to only one of the optical path for low luminance and the optical path for high luminance at a time, and
   a control unit configured to control luminance by controlling the output of the laser light in the light source unit, and controlling the switching of the optical path of the laser light by the optical path switch element.

2. The scanning device according to claim 1, wherein, in the plurality of optical paths, at least the optical path for low luminance includes a plurality of luminance attenuation elements.

3. The scanning device according to claim 1, wherein a condenser lens configured to collect the laser light is disposed between the light source unit and the projection mirror.

4. The scanning device according to claim 1, wherein the light source unit includes a plurality of light sources configured to output the laser light having different wavelengths.

5. The scanning device according to claim 4, comprising a multiplexing optical system configured to multiplex the laser light output from the plurality of light sources.

6. The scanning device according to claim 1, wherein an aperture is disposed between the optical path switch element and the projection mirror.

7. The scanning device according to claim 6, wherein an aperture is disposed between the optical member and the projection mirror.

8. The scanning device according to claim 1, wherein a light receiving element configured to detect the laser light is disposed in a subsequent stage of the optical member.

9. The scanning device according to claim 8, wherein the light receiving element at least detects the laser light that passed through the optical path for low luminance.

* * * * *